(12) United States Patent
Leidig (10) Patent No.: US 7,974,960 B2
(45) Date of Patent: Jul. 5, 2011

(54) SYSTEM FOR IDENTIFICATION OF CONTEXT RELATED INFORMATION IN KNOWLEDGE SOURCES

(75) Inventor: Torsten Leidig, Karlsruhe (DE)

(73) Assignee: SAP AG, Walldorf (DE)

( * ) Notice: Subject to any disclaimer, the term of this patent is extended or adjusted under 35 U.S.C. 154(b) by 728 days.

(21) Appl. No.: 11/305,769

(22) Filed: Dec. 16, 2005

(65) Prior Publication Data

US 2006/0136409 A1    Jun. 22, 2006

(30) Foreign Application Priority Data

Dec. 17, 2004    (EP) ..................................... 04106656

(51) Int. Cl.
*G06F 7/00*    (2006.01)
(52) U.S. Cl. ........................................ 707/705; 707/609
(58) Field of Classification Search .................. None
See application file for complete search history.

(56) References Cited

U.S. PATENT DOCUMENTS

| | | | |
|---|---|---|---|
| 6,715,005 B1* | 3/2004 | Rodriguez et al. | 710/41 |
| 2002/0105532 A1* | 8/2002 | Oblinger | 345/701 |
| 2006/0064416 A1* | 3/2006 | Sim-Tang | 707/6 |

* cited by examiner

*Primary Examiner* — Pierre M Vital
*Assistant Examiner* — Truong V Vo
(74) *Attorney, Agent, or Firm* — Brake Hughes Bellermann LLP (57) ABSTRACT

A computer system for identifying information related to a context includes a context gathering service configured to receive context deltas from a runtime and to identify a current context state. A context delta describes a change from a previous context state to the current context state. The computer system also includes a semantic model with elements and attributes, wherein an element represents one or more context states and an attribute is assigned to the element. The computer system further includes a rule interpreter configured to map the current context state to a current element and a recommender service configured to identify information related to the context in a knowledge source. The recommender service is identified by one or more attributes at least one of which is assigned to the current element.

20 Claims, 7 Drawing Sheets

Fig. 2 displayed context of portal

SYSTEM FOR IDENTIFICATION OF CONTEXT RELATED INFORMATION IN KNOWLEDGE SOURCES

CROSS-REFERENCE TO RELATED APPLICATIONS

This application claims priority under 35 U.S.C. §119 to European Application No. 04106656.4, filed Dec. 17, 2004, and titled, "SYSTEM FOR IDENTIFICATION OF CONTEXT RELATED INFORMATION IN KNOWLEDGE SOURCES," which is incorporated by reference herein.

TECHNICAL FIELD

The present description relates generally to the field of electronic data processing and in particular to providing information to a user of a computer system.

BACKGROUND

A user of a computer system is generally interacting with a computer program that is running on the computer system. The computer program provides a context to the user. The context includes a content that is displayed to the user. The context further includes properties that are not displayed to the user but that influence the interaction between the user and the program. An example for such a property is a state in which the program requires a specific input from the user. The interaction is done through a user interface. The user interface displays a part of the context to the user and registers activities of the user.

In the art, there are numerous contexts for which information that may be helpful to the user is provided to the user. In case the context is complex it is convenient to provide the information. A complex context may be a context that offers more than one possibility for inputs from the user. For the user it may not be obvious what input is required by the program. The provided information can give a description of the required input or give a list of possible inputs. A further example for the complex context includes a displayed content using a specific term. The provided information may give an explanation of the specific term.

Complex programs are programs for which the provision of information which may be helpful is convenient. The complex programs may provide the complex context or a large number of different contexts. Frequently, they require a lot of provided information.

SUMMARY

According to one general aspect, a system identifies information that may be helpful for a user of a complex program. The information is related to a context and the information is identified in a knowledge source to which the system has access.

Further according to this general aspect, the system comprises a semantic model. The semantic model may contribute to a storage efficiency of the system by, for example, decoupling the information from the context. The information is not directly assigned to the context but it is identified by a recommender service that is identified by an attribute of the semantic model. Therefore, the same information can be used for different contexts storing the information once by adding attributes identifying the same recommender service to different elements of the semantic model.

The system is also flexible because information and knowledge sources can be changed without affecting the context of the complex program. Such changes may require changes of the semantic model and/or the recommender services. It is also possible to change the complex program or the context without affecting the knowledge sources. Such changes may imply changes of a rule interpreter and possibly of the semantic model.

The efficiency and the flexibility improve the maintainability of the complex program and the information that may be helpful for the user. It is possible that a specialized person for updating the information maintains the system and the knowledge sources without changing the complex program. A further person may maintain the complex program.

The system provides a possibility to specify one or more contexts and to identify the information related to the one or more contexts. Therefore, the user may be provided with an accurate help that contains relevant and required information specifically to a current context. This may be supported by a context gathering service which may take into account different aspects of the runtime to identify the current context state.

According to another general aspect, a context delta is received from a runtime, wherein the context delta describes a change from a previous context state to a current context state. The current context state is identified by merging the context delta with the previous context state. The current context state is mapped to a current element of a semantic model, wherein the semantic model has elements which represent context states and attributes which are assigned to the elements and which have identifications of recommender services. A recommender service is identified by determining an attribute assigned to the current element and by reading an identification of the recommender service from the attribute, wherein the recommender service is configured to identify information related to the context in a knowledge source.

According to another general aspect, a computer program product comprises instructions that when loaded into a memory of a computer system cause the computer system to receive a context delta, wherein the context delta describes a change from a previous context state to a current context state, identify the current context state by merging the context delta with the previous context state, map the current context state to a current element of a semantic model, wherein the semantic model has elements which represent context states and attributes which are assigned to the elements, and identify a recommender service by determining an attribute assigned to the current element and by reading an identification of the recommender service from the attribute, wherein the recommender service is configured to identify information related to the context in a knowledge source.

The details of one or more implementations are set forth in the accompanying drawings and the description below. Other features will be apparent from the description and drawings, and from the claims.

DETAILED DESCRIPTION

Following descriptions of examples and embodiments are by way of example only, and do not limit the scope of the invention.

Figure 1A:
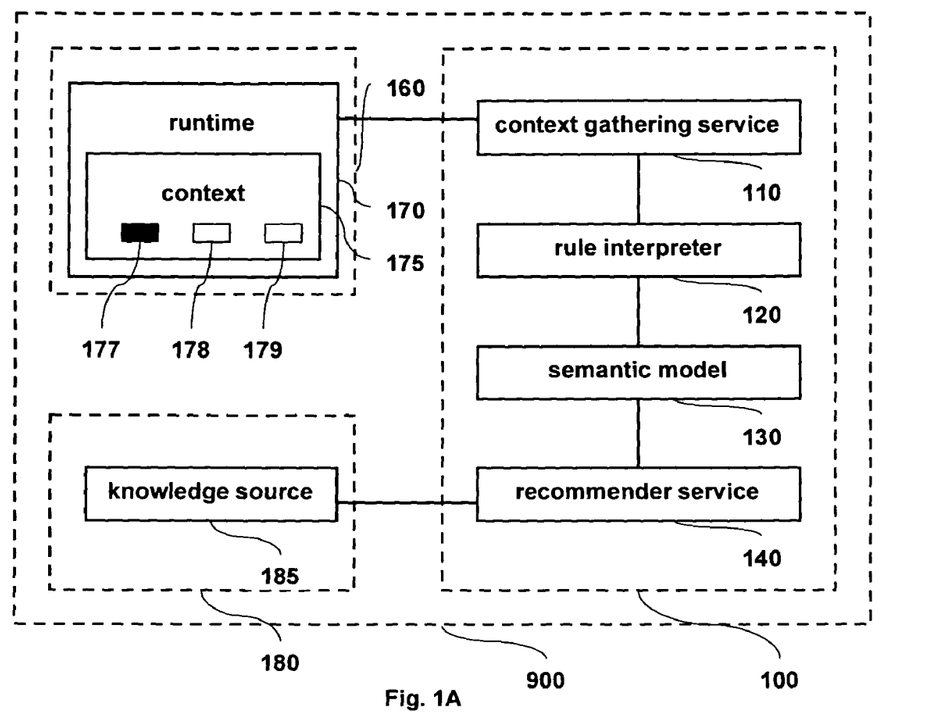
FIG. 1a and FIG. 1b show a block diagram with components of a system for identification of context related information in knowledge sources.
Figure 1B:
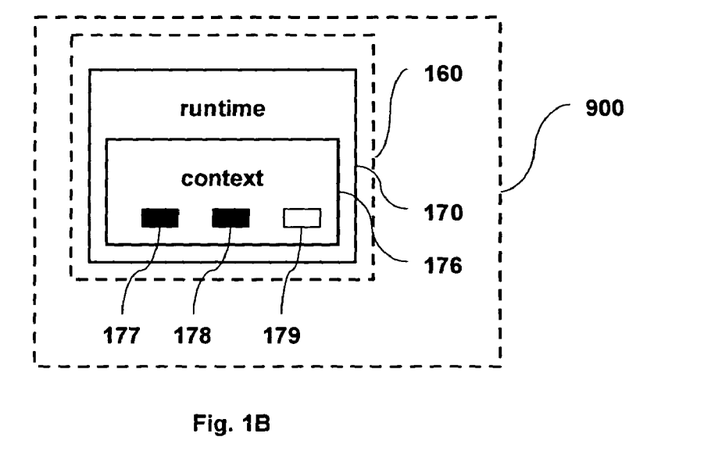

FIG. 1a and FIG. 1b show a block diagram with components of an identification system 100 for identification of context related information in knowledge sources, a context system 160, and a knowledge system 180. In the figure a block represents a component or an object of a system and a line between blocks represents an interface for exchanging data between the blocks. The identification system 100 exchanges data with the context system 160 providing resources to a computer program and with the knowledge system 180 providing a knowledge source 185. The three systems 100, 160, and 180 are parts of a composite system 900. The composite system can be for example a network system of one or more servers. The three systems are shown as separate systems. They can be implemented on one computer system or on more than one computer system. Generally, the identification system 100 accesses information that is related to a context. The context is provided to a user by the computer program. An execution of the computer program is done by a runtime 170. The runtime 170 is in existence during an operation of the computer program and it includes objects that the context system 160 requires to execute instructions of the computer program. The runtime changes during the operation of the computer program according to the instructions of the computer program. As an example, the computer program is configured to register predefined activities of the user. The activities influence the context and change the runtime accordingly. For example, a specific activity may require an execution of a function module of the computer program. This may add instructions of the function module and global objects in the function group to the runtime. In one example embodiment, the runtime identifies a context delta which is a change from a previous context state 175 to a current context state 176.

FIG. 1A shows the composite system 900 in the previous context state 175 which changes to the current context state 176 as shown is FIG. 1B. Objects 177 and 179 are not changed but object 178 is changed. The context delta identifies the change of the object 178. The current context state 176 includes also the unchanged objects 177 and 179.

As an example a purchase order system is considered for system 160. The purchase order system is configured to accept an input of a product and a quantity. The input is saved after a save button is pressed. The input is sent to a supplier after a send button is pressed. A context delta may describe that the save button has been pressed. Following the successful saving, a further context delta may describe that the input has a status of being saved. The context state may include further objects, for example inputs that have been entered previously. It is also possible that a further system sends a signal indicating a shortage of a specific product to the purchase order system. The receiving of the signal may also be identified in the context delta. The identification system 100 can inform the user about the signal with a list of optional activities which can be selected by pressing buttons. The system registers the optional activity that the user selects. The context delta may describe that in a specified area of the interface the user is informed about the signal with the list of activities. The context may include also other areas of the interface and the other areas may not be identified in the context delta. The runtime provides identified context deltas to a context gathering service 110. The context gathering service 110 is configured to receive the context deltas. Typically, there is a plurality of objects belonging to the runtime and a context delta can be received from any object of the plurality. The context gathering service 110 may be configured to receive a context delta for selected activities that are relevant for identifying information. An example for a selected activity is the pressing of the save button. The pressing of a print button may, for example, not be a selected activity and consequently the context gathering service does not receive a context delta for the activity.

The context gathering service 110 identifies the current context state 176 and provides an identification of the current context state 176 to a rule interpreter 120. The rule interpreter 120 is configured to map the current context state to a current element of a semantic model 130 and to provide an identification of the current element to the semantic model 130. Rules of the rule interpreter 120 are predefined and determine which element represents which context state. The rules may have been created by a developer of the context system 160 or by an information developer. The information developer can design the rules in such a way that, for example, two similar but different context states are mapped to two different elements or that for example two similar but different context states are mapped to a single element. In the example, the information developer can decide that the different context states before pressing the save button and after pressing the save button are mapped to a single element. However, after the input has acquired the status of being saved the current context state 176 is mapped to a current element which is different from the previous current element. In this way, the rules and the semantic model contribute to a definition of a granularity of the identification of the information. The granularity of the identification includes how specific is the context to which the system identifies information and how specific is the identification of the information to the context.

The semantic model 130 includes also attributes that are assigned to the elements. An attribute of the current element provides an identification of the recommender service 140. The identified recommender service 140 is configured to identify information in the knowledge source 185. The attribute and a structure of the attribute depend on the recommender service 140. The attribute may, for example, include the path to an executable program which provides the recommender service. The attribute may also specify a file in which there is a link to the recommender service. In the example, the user has saved the input and now requests help by pressing a help button. He has numerous options but does not know how to proceed. Triggered by the help request the identification system 100 identifies the recommender service by the attribute of the current element. In the example, the input has been saved and the context provides numerous options to continue with a new process. Accordingly, the recommender service identifies information in a training course that gives general information about possible processes after saving the input. Generally, there are different ways how the recommender service 140 identifies the information. In the example, the recommender service may be a direct link to the corresponding document of the training course. Alternatively, the recommender service may also be a search engine provided with phrases to search the training course. The phrases may be taken from the content of the current context state. It is convenient to use information from the content in order to identify accurately the information which may be helpful to the user. Alternatively, the recommender service may include a key phrase that specifies the context of the user after the saving. The key phrase may be a metadata of the structured training course. The recommender service may then identify the information in the training course which is marked by the key phrase. It can be advantageous to identify information in a knowledge source by using metadata. In this case the knowledge source is structured according to the metadata. The metadata may also include an identification of the user profile which is a classification of the activities of the user. The identification of the user profile is convenient because the user profile can be used to determine a knowledge level of the user and functionalities accessible to the user. The knowledge level and the accessible functionalities can contribute to a specific identification of the information which may be helpful to the user.

There are different ways how the information that may be helpful to the user is provided to the user. In one implementation, the identified information is displayed in a specific area of the interface. In a further implementation, the user is informed that information that may be helpful has been identified. The identified information may be provided to the user by offering an optional access to the identified information. In yet a further implementation, identification of the recommender service by the system 100 is triggered after the user has entered an invalid input. Again, the user may be provided with the identified information or with an access to the identified information.

Figure 2:
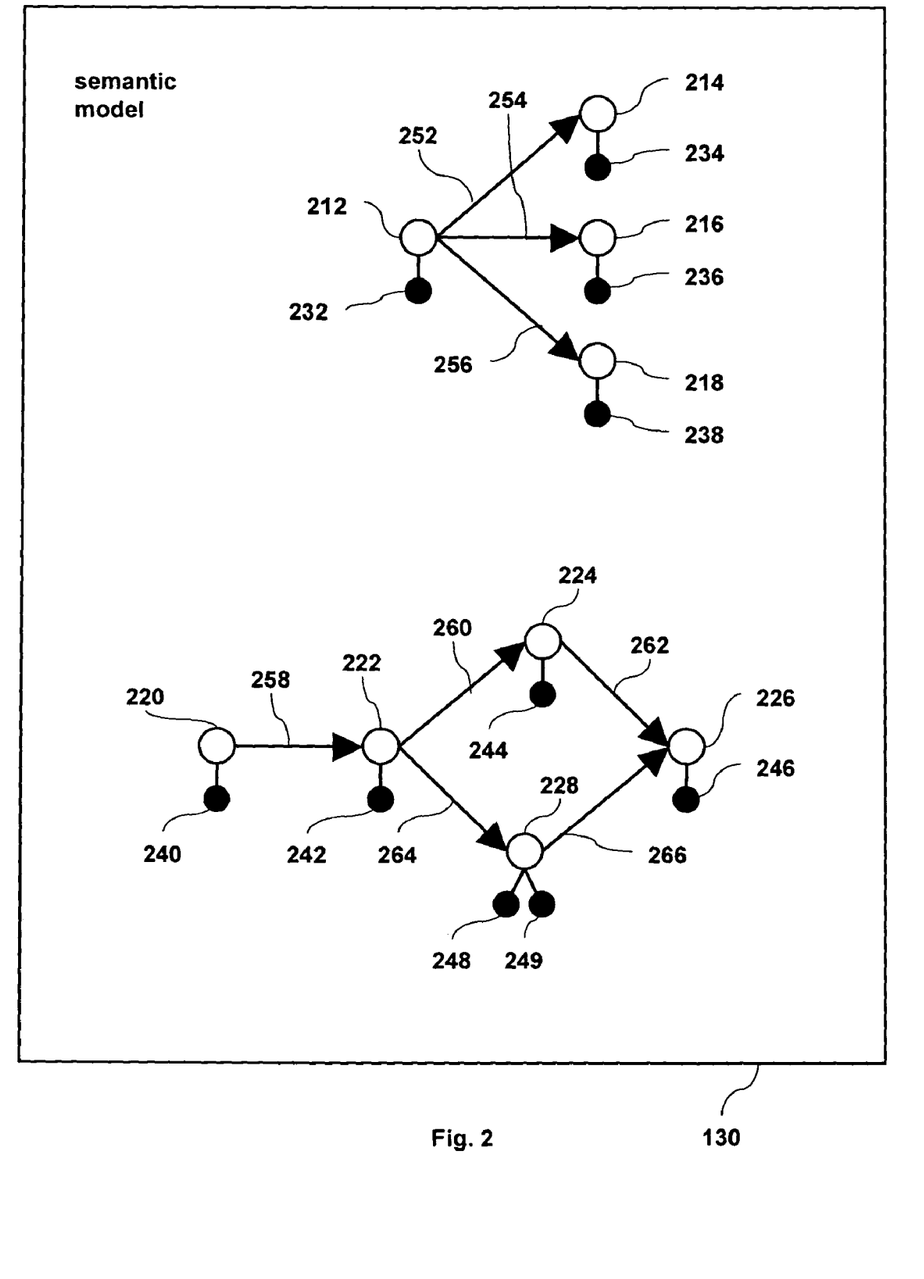
FIG. 2 illustrates an example of a semantic model of FIG. 1a with elements and relations between the elements.

FIG. 2 illustrates an example of the semantic model 130 as used by the identification system 100 (cf. FIG. 1). The semantic model has elements 212-228, attributes 232-249, and relations 252-266 between the elements. It can be advantageous to introduce relations between elements of the semantic model. This allows the system to analyze the activities of the user and to identify the information more specifically according to the activities of the user.

There are two different structures representing two different groups of context states that are provided by the computer program. The first structure includes elements 212-218. Element 212 represents a first context state, for example context state 175 (cf. FIG. 1), and element 214 represents a second context state, for example context state 176 (cf. FIG. 1). A relation 252 between the elements 212 and 214 represents an optional transition with a specified direction from the first context state to the second context state. In the example, the represented transition is possible in one direction. In the same way, elements 216 and 218 represent further context states that are accessible from the first context state, wherein optional transitions are represented by relations 254 and 256 respectively.

An example of a group of context states which is represented by the first structure is an intranet page of a company. The intranet page offers three links to further intranet pages. The runtime provides the current context state of the intranet page which is represented by the element 212. The context states which are accessible with the three links are represented by elements 214-218. The attribute of the element 212 identifies a specific recommender service. In case the user requests a help function the specific recommender service identifies information in a specific knowledge source. The specific knowledge source may contain information that is related to numerous intranet pages. In the specific knowledge source, the recommender service identifies the information that is specific to the context state represented by the element 212. In case the runtime registers that the user selects one of the three links the context delta identifies the selected link.

The context gathering service 110 identifies the current context state 176 (cf. FIG. 1) which includes the selected intranet page. The rule interpreter 120 maps the current context state 176 (cf. FIG. 1) to the current element, for example to element 216. For element 216 the attribute 236 identifies a further specific recommender service. In case the user request the help function the further specific recommender service identifies information in a further specific knowledge source. The further specific knowledge source contains information that is related to the intranet page represented by the element 216 and the recommender service is configured to identify this information. However, the further specific knowledge source may also contain information related to the intranet page represented by element 218. Therefore, attribute 238 of element 218 identifies a recommender service that identifies also information in the further specific knowledge source. In the example, the identification of the current element is done for every received context delta but the identification of the recommender service and the identification of the information are done in case the user requests help.

Generally, relations of a semantic model may also describe different types of relations between a first and second context state. There are further types of relations which may be represented by relations in the semantic model. An example for a further type of a relation is an optional transition in both directions between the first and the second context state. A further example for the type is a relation where the second context state is a part of the first context state, that is, the second context state depends on the first context state and recommender services that are identified for the first context state are also identified for the second context state. Furthermore, a relation between two elements may describe a relation between a group of context states represented by the first element and a group of context states represented by the second element.

The second structure includes elements 220-228 and represents a different group of context states that are related to each other by relations 258-266. The relations represent again the optional transition from the first context state to the second context state. The second structure includes element 220 with relation 258 to element 222. Element 222 is related by relation 260 to element 224 and furthermore by relation 262 to element 226. Element 222 is also related by relation 264 to element 228 and furthermore by relation 266 to element 226. In this example, element 226 represents two different context states one of which results from the context state represented by element 224 and one of which results from the context state represented by element 228. In the example, the context states represented by element 226 are different with respect to one detail and it is convenient to access the information related to the context states from one knowledge source using one recommender service. Therefore, the semantic model and the rules are created so that element 226 represents two context states.

In case the runtime provides the context state that is represented by element 228 and the user requests the help function it may be convenient to identify two different recommender services. This is done by assigning attribute 248 and 249 to element 228, each attribute identifying one recommender service. Furthermore, it may be convenient to take into account attributes of elements which have been identified as current elements previously to element 228. This is the case for the attribute 220 of element 220 which is related to element 228 by relations 264 and 258. In the example, element 220 has been determined previously as the current element. Furthermore, it may be convenient to include also an attribute of an element of the first structure, e.g. element 218. More specifically, it may be convenient to access information from the knowledge source for element 218 and to use the information for the context represented by element 228 under the condition that element 218 was determined previously. The information can be identified more specifically in case the attributes of more than one element are taken into account. The additional elements can relate to previous activities of the user or to potential future activities related to the current context state.

In order to provide the identification system 100 with the information that element 218 has been determined, the information may be stored using a persistent storage device, such as for example a hard disc drive. Therefore, the stored information is available after the computer program has been stopped and restarted again by the user. The system may use the available stored information to determine, for example, the specific knowledge and experience of the user. Accordingly, the identification system 100 may identify the specific information which may be helpful to the user. It may be advantageous to store the current element in a persistent way and to access it again for identifying the recommender service. The stored elements provide further information about activities from a previous session of the user.

Figure 3:
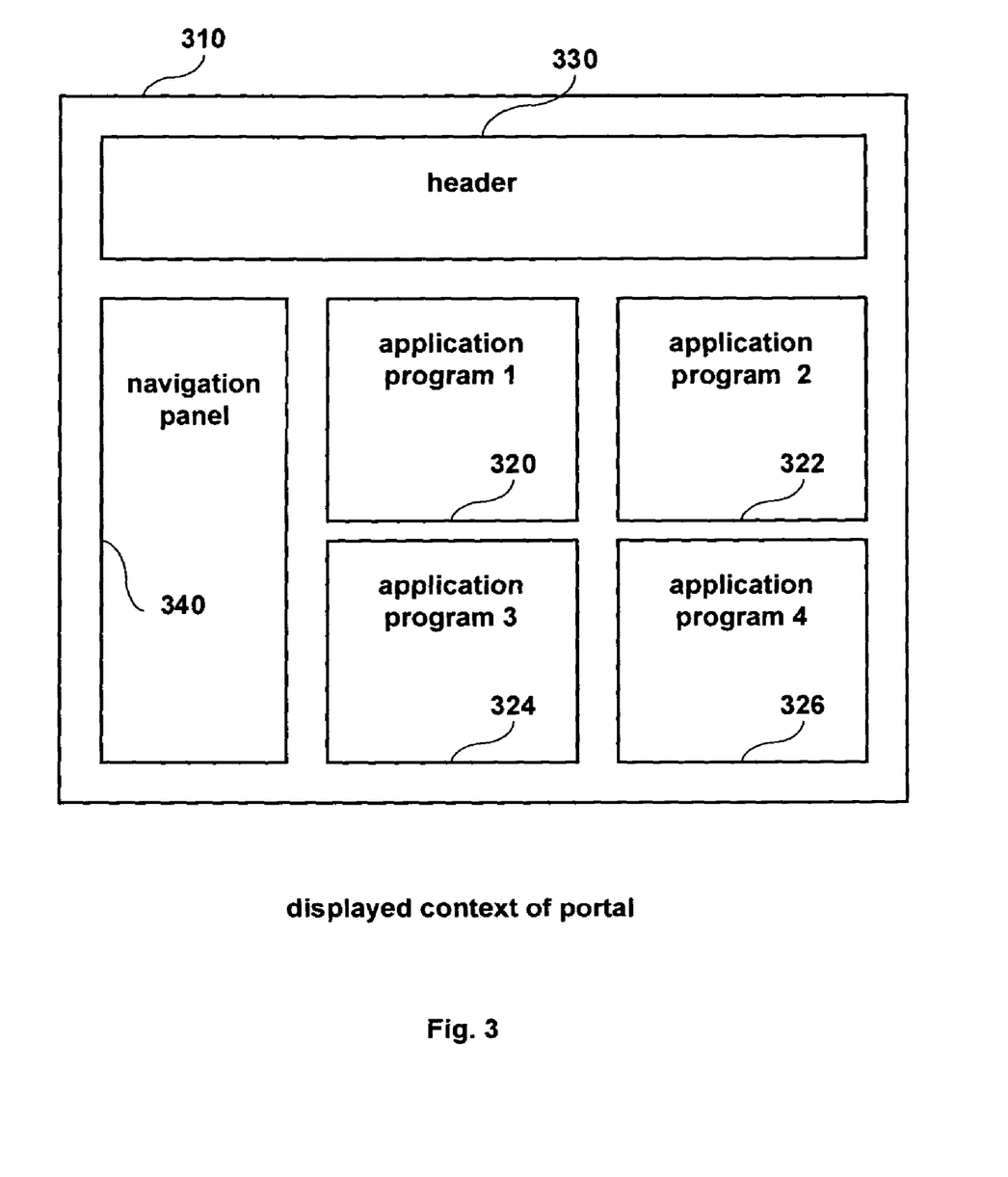
FIG. 3 illustrates an example composition of a portal.

FIG. 3 illustrates an example composition of a portal. The portal is an example of a computer program that runs or is run by the context system 160. The portal typically provides the user with interaction with a plurality of further computer programs. The context of the portal includes the contexts or parts of the context of the further computer programs. The portal assigns an area of the displayed context 310 of the portal to the displayed context of each of the further computer programs. The assigned area can be a portlet. In the figure there are four portlets 320-326 for four further computer programs, portlet 320 for application program 1, portlet 322 for application program 2, portlet 324 for application program 3, and portlet 326 for application program 4. The portlets are part of a content area of the portal and the further programs provide content with respect to the portal. The displayed context of the portal further includes an area for a header 330. In the header there are typically administration and top-level navigation information providing an orientation to the user. In an area for a navigation panel 340 there is typically more detailed navigation information which also includes dynamic navigation objects, e.g. navigation trees. Frequently, in the navigation panel there are also links to related content.

It is convenient to use the system for accessing context related information for a context of a portal because of following reasons: The portal provides a complex context with numerous different aspects. In case the user of the portal does not have sufficient knowledge about one of the aspects, information about the one aspect may be provided. In certain examples of the portal environment, the application programs are not changed, but they are used together with other application programs. Such a use of the application programs may not be intended by the developers of the programs and may require knowledge that is not provided by the programs. Frequently, the application programs may not be changed so that they can provide further help information taking into account the use of the programs in a portal environment. Therefore, a system separate from the programs is convenient for providing the information. Frequently, the user of the portal has a detailed knowledge about some of the application programs but may request help information about the dependencies between the application programs. Therefore, also high level information and background information about processes supported by the portal may be requested. It is convenient to use available knowledge sources for providing different types of information that may be helpful to the user. The available knowledge sources may be created specifically for the portal but they may also be created for different purposes, e.g. for training courses. However, the help information is required to be specific to the current context of the portal and to the knowledge of the user. Therefore, the identification of the help information should be flexible to take the available information about a current situation of the user into account.

The following example describes a portal user with a user profile of a role of an operational purchaser. In the example, the identification system 100 and the knowledge system 180 provide a workplace-embedded learning system to the portal. The role of the purchaser includes tasks like execution and control of complete purchase order processes. This includes creation of purchase orders. Some of the purchase orders are created manually and some are created automatically from an enterprise resource planning program. Other activities comprise purchase order confirmation, delivery, and invoicing. The purchaser is responsible for in-time delivery and quality, monitors performances of suppliers, and stays in close contact with the suppliers.

The purchaser has to carry out a number of tasks of different complexity, some of which can be planned, and some of which are unexpected and time critical. The unexpected tasks may be triggered by alerts. Therefore the user profile is characterized by multi-task parallelism and problem solving that may utilize, for example, data search, data exploration, and data interpretation. The user may collaborate with people from production, finance, sales, quality management, goods receipt, warehousing and other departments.

The portal provides a control center in the form of a portal composition that is specific for the user profile of the user. When the user starts to work, he or she opens the control center that is constructed of one or more portlets. The portlets contain, for example, information monitors and generic quick activities. The control center provides an overview of actual information and is used as a starting point to other applications for typical purchaser activities.

The context gathering service 110 receives context deltas about the control center page and the portlets of the control center. For example, the user may start the portal, and the current context state 176 may be mapped to the current element of the semantic model 130. For example, the mapping may be done in real time according to the predefined rules of the rule interpreter 130. As an example, a predefined rule may include a description of a specific state of a button and specify the element to which a context matching the description is mapped. The user has a number of optional activities which are offered by the navigation panel 340 of the portal and the portlets with information monitors.

At this point, the recommender agent may recommend generic learning content on an overview or conceptual level for the displayed monitoring tasks. The recommender agent may further recommend the possible activities for the specific purchaser role. The knowledge source in this case may include Learning Object Database. Information from the Learning Object Database can be helpful for employees that are new to the purchaser role.

Because of a tracked learner state which is stored in a persistent storage device the recommender agent may not show a previously provided information again. Instead, the recommender agent may present, for example, new information about policies and regulations. In this case the knowledge source may be for example a corporate news information system which is annotated by metadata. The metadata describe the specific target audience in terms of user profiles. Providing information from this knowledge source keeps employees informed about actual knowledge which is just-in-time and related to the role specific daily tasks.

A further example for providing information to the user is related to the purchasing activity of the user. The user enters a concrete activity like responding to a specific stock alert, analyzing the stock situation, and creating a new purchase order. In this case the context gathering service recognizes that the page is newly composed of different specific portlets representing a certain work situation. The work situation which is the context created for the user is represented by an element of the semantic model. The work situation and the navigation structure imply different options to continue. The user selects an activity and is proceeding with the activity. The semantic model is updated by identification of new current elements according to the activities of the user. The recommender agent identified by an attribute of the current element may find more specific knowledge items, for example training material to be offered to the user. The training material may include explanations or action knowledge such as animations of processes and procedures. The recommender agent may identify information for special cases related to specific suppliers or procedures concluded from the portlet context. Again the knowledge source may be the training database.

The recommender agent may also propose information from other knowledge sources such as a problem database. The user may learn from previous cases with similar context. In this case the problem database can be a knowledge source or knowledge tool.

The recommender agent may also propose to contact other people from engineering in case the user may need some further consultation for complex technical problems with parts to order. In this case the recommender agent may use a skill database to conduct recommendations.

Within a specific activity the purchaser has to carry out several steps. An activity may be interrupted and continued later. It is possible to keep track of interrupted activities by relying on the stored elements of the semantic model of the work situation. The recommender agent can explain what possibilities exist for proceeding with the activity. The recommender agent may identify information from an SRM application program, i.e., the supplier relationship management application program.

The recommender agent may be identified by an attribute of an element which is related to the current element. In this way the semantic model models options that are available to the user for a work situation. Furthermore, the recommender agent can give more detailed training material in order to let the purchaser choose between different criteria relevant for optimizing the purchasing process. The different criteria may include, for example, product category, product, supplier, prices, delivery conditions, and delivery periods. The knowledge sources may include, for example, a training database, a master data management system, or reports generated from a data warehouse.

The semantic model can identify at a specific step within an activity the activity and other sequential or parallel steps possible within the activity. The recommender agent can use the information about the activity to explain to the user how the specific step is embedded in an overall procedure or process.

Figure 4:
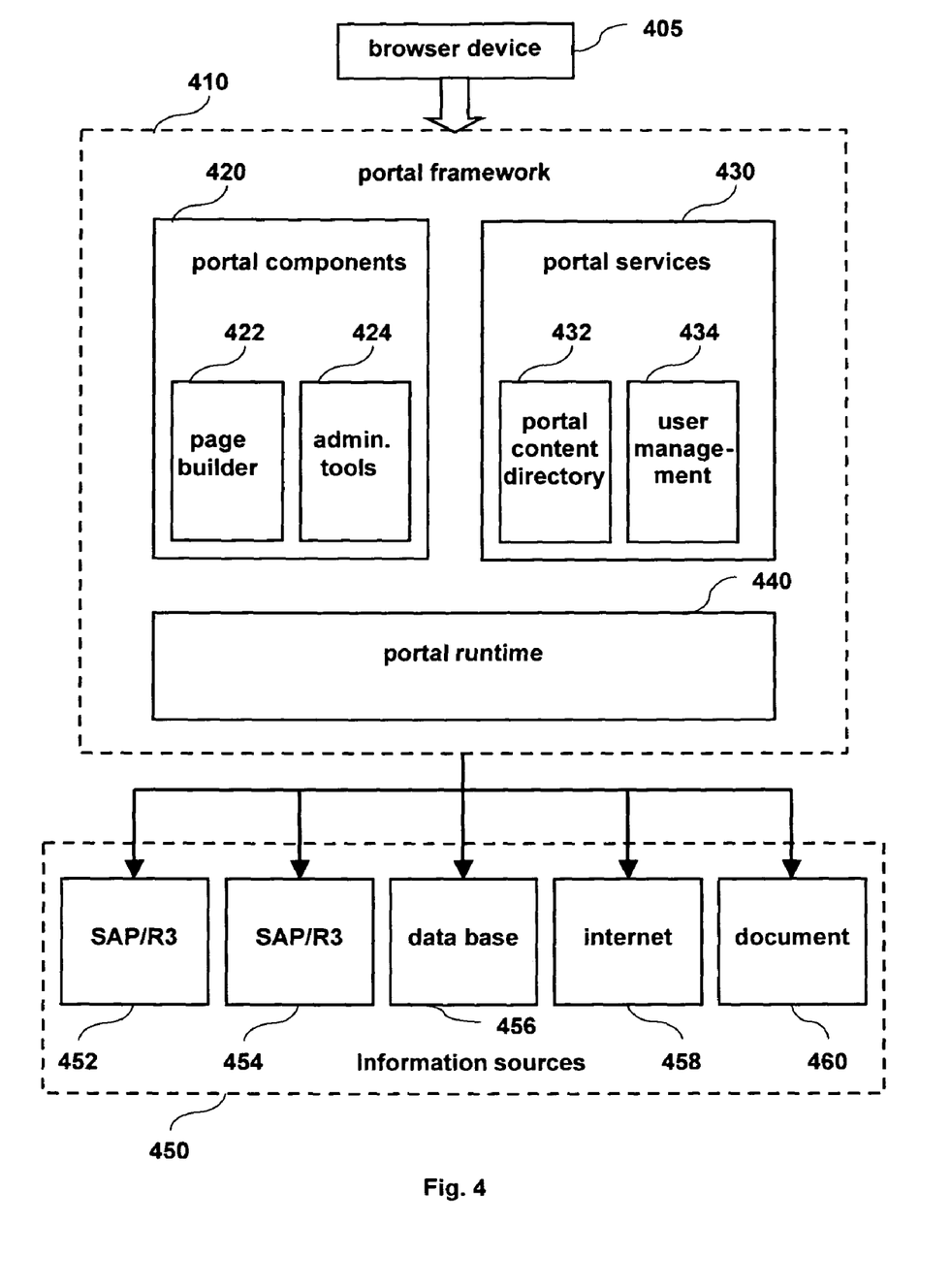
FIG. 4 is a simplified software architecture map of an example portal including information sources.

FIG. 4 is a simplified software architecture map of an example portal including information sources as further programs. The architecture map describes a concept of the portal. It is convenient to describe an example implementation using the concept. In the figure, a portal framework 410 provides the portal interface to the user. Provision of the interface is frequently a main task of the portal. The user has a browser device 405 to interact with the portal. In the above example the user is the purchaser and has the role of an operational purchaser. The browser device is convenient to the purchaser because he may use the internet to access the portal. In the figure, the browser device accesses the context from the portal framework. The portal framework includes three basic components: the portal components 420, the portal services 430, and the portal runtime 440. The portal services include a portal content directory 432 and a user management 434. In the figure, the portal content directory 432 is separate from the portal runtime 440. It is also possible to include the portal content directory in the portal runtime but may be useful to distinguish between the objects. The portal content directory maintains a functional abstraction of the content of the portal and the composition of the portal. The user management provides functions for authenticating users and administrating the authorization of the users. In the example, the user management has a definition of the role of the operational purchaser. Furthermore, the user management may specify permissions of the purchaser for activities. The purchaser may, for example, enter purchase orders but he may not change product master data. Two typical examples for portal components are a page builder component 422 and administration tools 424. The page builder is used to set up the portal composition but is usually not relevant to the user of the portal, for example to the purchaser. This is also the case for the administration tools which may be relevant for administrators of the portal.

The content of the portal is provided by information sources 450. The portal framework accesses each information source 452-460 which are the further programs in order to make it a part of the portal context. There are numerous different types of information sources some of which are displayed in the figure. For example, information source 452 is an SAP R/3 application program commercially available from SAP AG, Walldorf, Germany. The SAP R/3 program may be an enterprise resource planning program. There is a further SAP R/3 program 454 which may have a different functionality than the program 452. In the example, information source 452 may be a transaction for creating purchase orders and information source 454 may be a transaction for displaying product master data. Further example information sources are a data base program 456 for example to access entries in data base tables, an internet browser program 458 for example to access internet pages, and a word processor program 460 for displaying, modifying, and creating documents.

Figure 5:
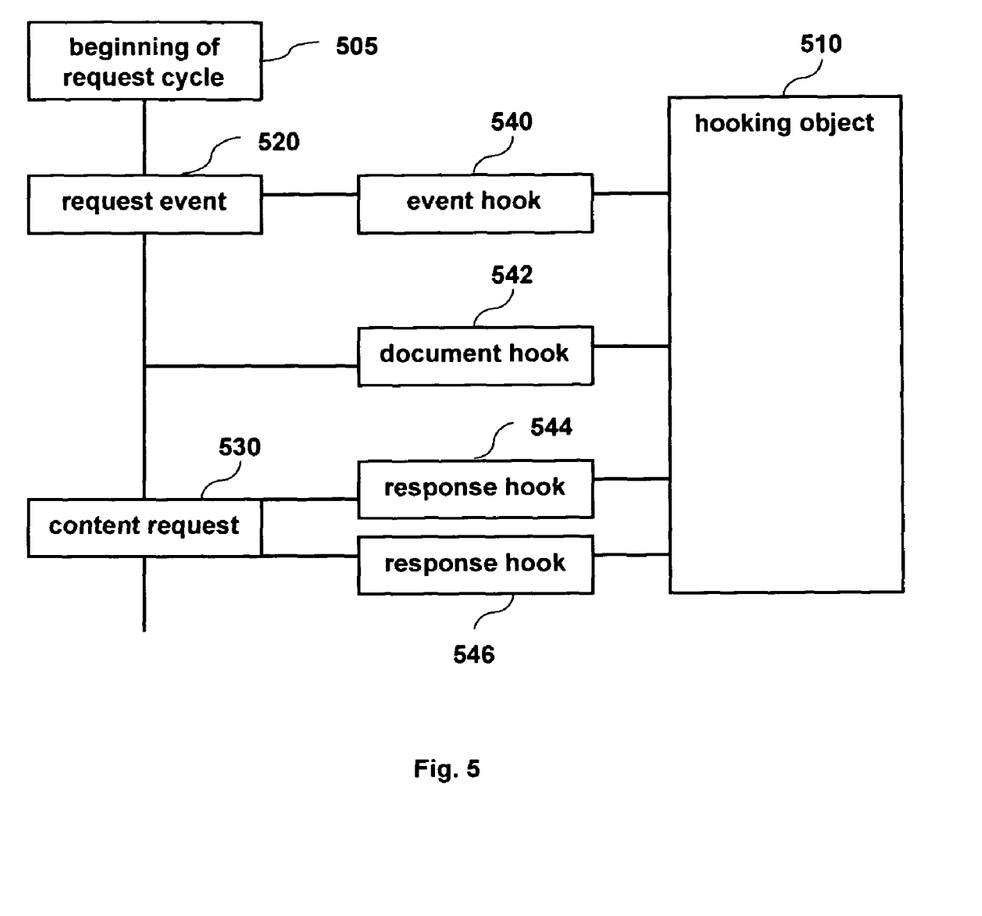
FIG. 5 illustrates an example hooking mechanism in the runtime of a portal.

FIG. 5 illustrates an example hooking mechanism in the runtime of a portal. Hooking mechanisms may also be applied to further computer programs. The hooking mechanism is effective during a request cycle of the portal. In the figure, there is an example set of instructions. The instructions are executed linearly and a starting point is a beginning 505 of the request cycle. Following the beginning 505 of the request cycle a hooking object 510 is configured to receive input of hooks 540-546. The hooks are predefined points in a sequence of instructions executed in the runtime. When the hook is reached in the sequence the hook may be executed, that is the runtime executes instructions assigned to the hook. The instructions assigned to the hook may be modified, for example, by the information developer before the creation of the runtime and without detailed knowledge about the portal. The instructions can include giving the input to the hooking object. The hooking object processes the input of a hook and transforms it into the context delta. This may require adding information about the portal runtime to the input of the hook.

It may be advantageous to use a hooking mechanism for the portal runtime. The hooking mechanism can be applied to a central part of the portal to obtain changes of context states for creating context deltas. Furthermore, the hooking mechanism can be configured to select the kind of context state changes that are provided as context deltas to the context gathering service.

Following an execution of some instructions, a request event 520 can be a result of the activity of the user. For example, the request event is launched because the user entered an input for one of the further programs of the portal content. Before the request event is launched an event hook 540 is reached in the sequence and gives the input to the hooking object. Following the event request the runtime arrives at a document hook 542. The document hook is reached during a construction of an output of a hyper text markup language (HTML) document. The HTML document is a document in a standard format for browser devices.

Content request 530 can be a request of the portal runtime to one of the application programs of the portal content. At the beginning of the request, response hook 544 is executed and, at the end of the request, response hook 546 is executed. The hooks may be used to define the context changes of the portal that are identified in the context deltas. There are further types of hooks which are available for the hooking mechanism, for example component hooks which are executed before a component method is executed. Further examples are Pod object model (POM) hooks which are executed at a creation of a POM node which is a node in a hierarchical document representation model.

Figure 6:
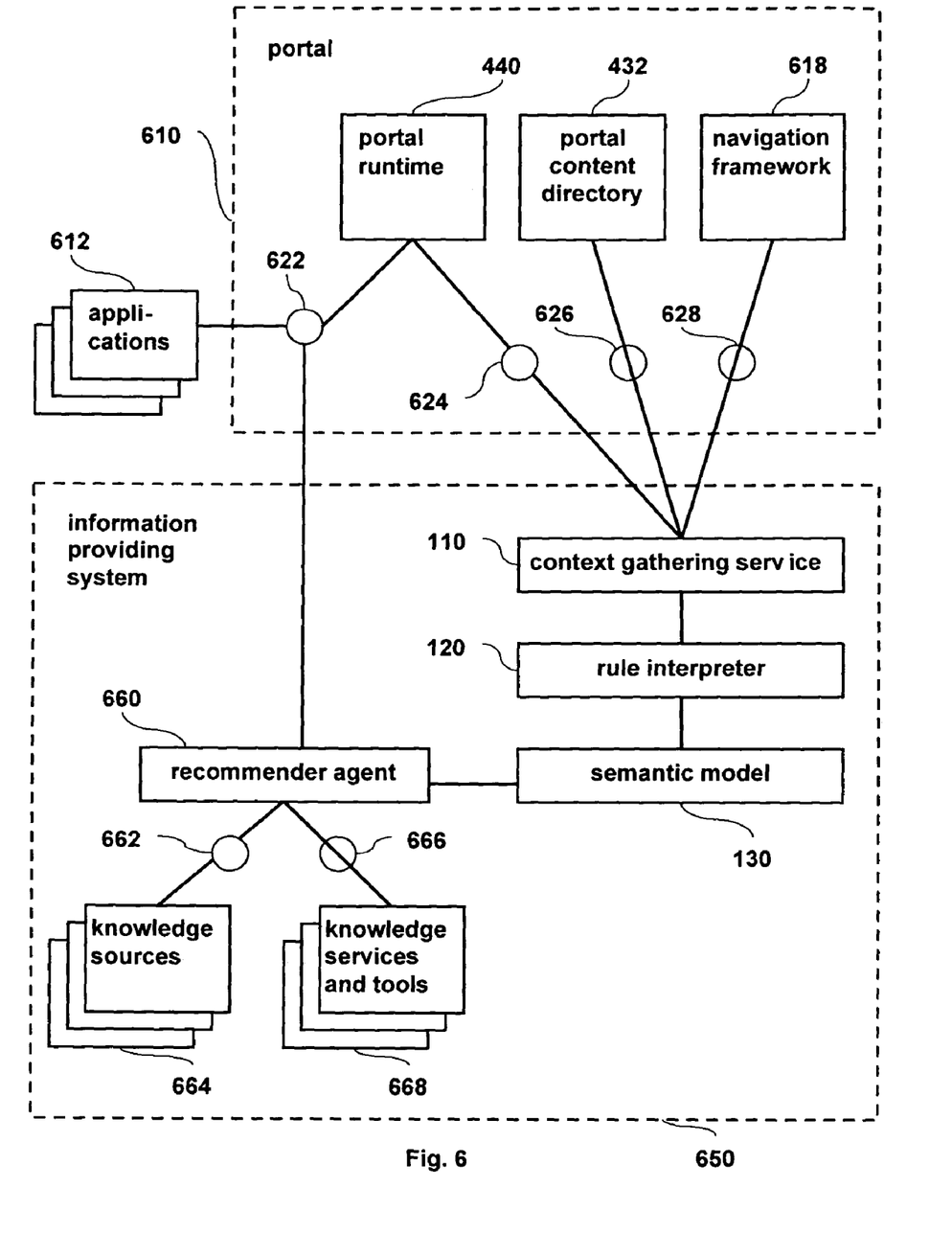
FIG. 6 illustrates an example of a portal and an information providing system.

FIG. 6 illustrates an example of a portal and an information providing system. The portal 610 accesses application programs 612 which in the example are the further programs of the portal content. The portal runtime 440 provides a general display channel 622 for displaying the content to the user of the portal. A channel is an interface between different systems, that is, the channel provides for communication between components of the different systems. The display channel is used by the application programs and by a recommender agent 660. The portal runtime provides an update channel 624 for sending the context deltas to the context gathering service 110. An example mechanism for collecting context deltas from the portal runtime includes the hooking mechanism.

The portal 610 further includes the portal content directory 432 with update channel 626 for the context deltas. The portal content directory 432 and a navigation framework are separate objects from the portal runtime 440. It is also possible to include the objects in the portal runtime but it is convenient to distinguish between the objects. The portal content directory is a central storage mechanism of the portal. It includes services for storing data of the portal and an interface to a database which stores the data. The data that are stored describe content objects of the portal, for example roles, pages, and work sets. The portal content directory separates the data according to data types. It may be convenient to access separated data because data of a specific type may be useful for identifying the information and data of a different type may not be useful for identifying the information. The portal content directory may send context deltas related to content objects that are currently handled by the portal and that are part of the context.

The portal 610 includes the navigation framework 618 with update channel 628 for the context deltas. The navigation framework provides a navigation environment for information about navigation steps of the user. The information about the navigation steps and a navigation hierarchy can be accessed with APIs, application plug-ins, of the computer system on which the portal 610 is operating. Examples for frequent navigation steps are launches of a new page in the content area of the portal, launches of a new window after running a web link for displaying a content, or changing substantially the context provided by a portlet.

By using the portal content directory and the navigation framework for providing the context deltas it is possible to specify precisely the context state changes that are desired to be identified in the context deltas. Furthermore, both components of the portal provide means for implementing mechanisms for identifying the context deltas.

In one implementation, the information providing system 650 includes the context gathering service 110, the rule interpreter 120, and the semantic model 130. The recommender services of the information providing system may be provided by a recommender agent 660. The recommender agent may be an autonomous computer program running continuously. In order to provide the recommender services, the recommender agent has a channel 662 for accessing one or more knowledge sources 664. It further has a channel 666 for accessing one or more knowledge services and knowledge tools 668.

Examples for knowledge services are services for sharing knowledge within a group and library services for accessing information from a library. Examples for knowledge tools are collaboration tools for contacting people that can provide information and learning tools providing introductory learning material. Further examples for knowledge sources are reports generated by a business information warehouse system. The business warehouse system stores data that are extracted from application programs, for example from an enterprise resource planning program. The reports can provide specific information that helps the user to find a decision. For example, the user may desire to determine a quantity of a specific product that is purchased for the next month. A report may calculate the purchase quantities of a plurality of products for the last twelve months. The user can request the help function and the information providing system provides him with the purchase quantities of the specific product for the last twelve months.

In one example implementation, a plurality of recommender services accesses a plurality of knowledge sources for a single context. The knowledge sources can provide information of different types to the user and the user can select the information that is helpful to him.

Figure 7:
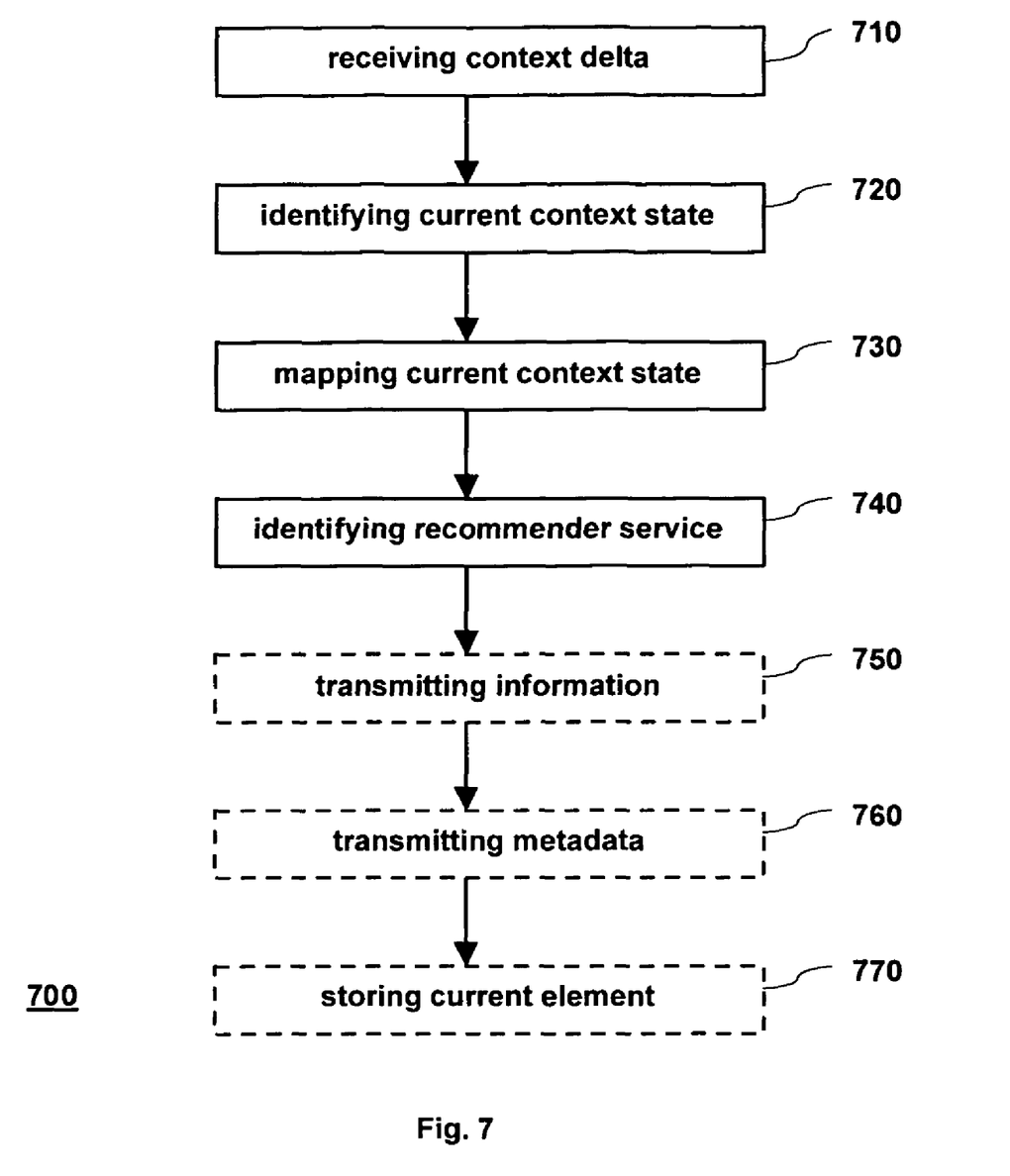
FIG. 7 is a simplified flow diagram of an example method for identifying context related information in knowledge sources.

FIG. 7 is a simplified flow illustrating methods 700. Optional method operations are illustrated by boxes 750-770 with dashed lines. The context delta is received (710) from the runtime 170 (cf. FIG. 1). The context gathering service 110 identifies (720) the current context state 176. Previous to receiving 710, the context gathering service 110 has identified the previous context state 175. The context gathering service merges the received context delta with the previous context state 175 to compute the current context state 176. In the example (cf. FIG. 1), the object 178 has changed. The object 178 may be, for example, a button that was selected by the user. The context delta may describe that the button is selected. The context gathering service identifies the current context state 176 which includes that the button is selected. A mapping (730) of the current context state to the current element of the semantic model 130 follows. In the example, selecting the button may be a substantial change of the context. Therefore, the rule interpreter 120 may map the current context state to the current element which is different from the element to which the previous context state 175 has been mapped. Identifying 740 the recommender service includes determining an attribute of the current element and reading an identification of the recommender service 140 from the attribute. In the example, the receiving (710), identifying (720) and mapping (730) may be executed for each received context delta but identifying (740) may be only executed in case the user requests help. Furthermore, identifying information related to the context 176 may include identifying a recommender service by determining a further attribute. The further attribute may be assigned to an element to which a context state has been mapped previously to the mapping (730) to the current element. The further attribute may also be assigned to an element that is related to the current element. It may be convenient to assign further recommender services for providing a comprehensive help to the user.

Following the identifying (740), the transmitting (750) of information to the identified recommender service 140 is executed. The information specifies a content that is a part of the context. The information may be used by the recommender service to identify information in the one or more knowledge sources. Transmitting (760) metadata of the one or more knowledge sources from the attribute to the recommender service may also contribute to identify information in the one or more knowledge sources. Transmitting the information about the content and the metadata is convenient because it may be possible to identify more information in the knowledge sources and different kinds of information, as well as less information that may be irrelevant to the user. Storing (770) an identification of the current element of the semantic model on the persistent storage device is convenient for accessing the stored identification again. The stored identification is available after for example stopping a transaction. Following a new transaction, the stored identification of the element may lead to identifying further information in the knowledge sources. In case of the context of the portal 610, receiving context deltas from the portal context directory 432 and the portal navigation framework 618 is convenient for identifying useful recommender services. A sequence of the method including the transmitting (750) the information, transmitting (760) the metadata, and storing (770) the current element may be changed.

What is claimed is:

1. A computer system for identifying information related to a context, the computer system comprising:
a context gathering service, executed by a processor, and configured to receive a context delta from a runtime and to identify a current context state using the context delta by merging the context delta with a previous context state, wherein the context delta describes a change from a previous context state to the current context state including a runtime change related to an object;
a semantic model with elements and attributes, wherein an element represents one or more context states stored in a memory and an attribute is assigned to the element and the semantic model defines different types of relations between context states comprising an optional transition and a specified direction between the context states and the semantic model enables information to be decoupled from the context, wherein the context is the context of a portal that is configured to provide one or more portlets, a portlet including a specified area of a user interface of the portal and representing a user interface of an application program;
a rule interpreter, executed by the processor, and configured to receive the current context state from the context gathering service, to provide an identification of a current element to the semantic model and to map the current context state to the current element of the semantic model according to predefined rules; and
a recommender service, executed by the processor, and configured to identify information related to the context in a knowledge source, wherein the recommender service is identified by one or more attributes, at least one of which is assigned to the current element as defined in the semantic model, the current element being identified by the rule interpreter,
wherein a recommender agent is configured to receive input including one or more of the following data: an identification of the recommender service, metadata assigned to the one or more attributes identifying the recommender service, and content being part of the context; the recommender agent being further configured to use the received input to identify the information in the knowledge source and to provide the identified information to a user of the portal.

2. The system of claim 1 wherein a plurality of recommender services is configured to access a plurality of knowledge sources and the plurality of the recommender services is identified by a plurality of attributes, at least one of which is assigned to the current element.

3. The system of claim 1 wherein the semantic model defines a relation between a first element and a second element specifying a relation between the one or more context states represented by the first element and the one or more context states represented by the second element.

4. The system of claim 1 wherein the recommender service is identified by the attributes of one or more elements to which context states have been mapped previously to a mapping to the current element.

5. The system of claim 1 wherein the recommender service is identified by an attribute of a further element that is related to the current element, wherein the further element is related to the current element in case that a relation or a sequence of relations connects the further element and the current element.

6. The system of claim 1 wherein an identification of the current element of the semantic model is stored on a persistent storage device.

7. The system of claim 1 wherein information about a content being part of the context is used by the recommender service to execute a query in the knowledge source.

8. The system of claim 1 wherein a metadata of the knowledge source is assigned to the one or more attributes identifying the recommender service, wherein the metadata describes a characteristic of the information in the knowledge source.

9. The system of claim 8 wherein the metadata includes an identification of a user profile.

10. The system of claim 1 wherein hooks are used to identify the context deltas in a portal runtime, a hook being a defined point in a set of instructions of the portal runtime that are executed during a request cycle of the portal.

11. The system of claim 1 wherein the context gathering service is configured to receive a context delta from a portal content directory, the context delta specifying a change affecting an object that is identified by the portal content directory.

12. The system of claim 1 wherein the context gathering service is configured to receive a context delta from a portal navigation framework, the context delta specifying one or more navigation steps registered by the portal navigation framework.

13. A method for identifying information related to a context, the method comprising:
- receiving a context delta from a runtime, wherein the context delta describes a change from a previous context state to a current context state including a runtime change related to an object;
- identifying the current context state by merging the context delta with the previous context state;
- providing an identification of a current element to a semantic model and mapping the current context state to the current element of the semantic model, wherein the semantic model has elements which represent context states and attributes which are assigned to the elements and which have identifications of recommender services and the semantic model defines different types of relations between context states comprising an optional transition and a specified direction between the context states and the semantic model enables information to be decoupled from the context, wherein the context is the context of a portal that is configured to provide one or more portlets, a portlet including a specified area of a user interface of the portal and representing a user interface of an application program;
- identifying a recommender service by determining an attribute assigned to the current element as defined by the semantic model and by reading an identification of the recommender service from the attribute, wherein the recommender service is configured to identify information related to the context in a knowledge source; and
- receiving, at a recommender agent, input including one or more of the following data: an identification of the recommender service, metadata assigned to the one or more attributes identifying the recommender service, and content being part of the context; and using the received input to identify the information in the knowledge source and providing the identified information to a user of the portal.

14. The method of claim 13 further comprising identifying a further recommender service by determining a further attribute assigned to a further element to which a context state has been mapped previously to mapping to the current element.

15. The method of claim 13 comprising identifying a further recommender service by determining a further attribute assigned to a further element that is related to the current element, wherein the further element is related to the current element in case that in the semantic model a relation or a sequence of relations connects the further element and the current element.

16. The method of claim 13 further comprising storing an identification of the current element of the semantic model on a persistent storage device.

17. The method of claim 13 further comprising transmitting information about a content being part of the context to the identified recommender service.

18. The method of claim 13 further comprising transmitting metadata to the identified recommender service, wherein the metadata is assigned to the one or more attributes identifying the recommender service and wherein the metadata describes a characteristic of the information in the knowledge source.

19. The method of claim 13 further comprising receiving a context delta from a hooking mechanism, wherein the hooking mechanism uses hooks to identify the context deltas in the runtime, a hook being a defined point in a set of instructions of the runtime that are executed during a request cycle of the runtime.

20. A computer program product being tangibly embodied on a non-transitory computer-readable medium and comprising program instructions that, when executed, cause a data processing apparatus to:
- receive a context delta, wherein the context delta describes a change from a previous context state to a current context state including a runtime change to an object;
- identify the current context state by merging the context delta with the previous context state;
- provide an identification of a current element to a semantic model and map the current context state to the current element of the semantic model, wherein the semantic model has elements which represent context states and attributes which are assigned to the elements and the semantic model defines different types of relations between context states comprising an optional transition and a specified direction between the context states and the semantic model enables information to be decoupled from the context, wherein the context is the context of a portal that is configured to provide one or more portlets, a portlet including a specified area of a user interface of the portal and representing a user interface of an application program; and
- identify a recommender service by determining an attribute assigned to the current element as defined by the semantic model and by reading an identification of the recommender service from the attribute, wherein the recommender service is configured to identify information related to the context in a knowledge source, wherein a recommender agent is configured to receive input including one or more of the following data: an identification of the recommender service, metadata assigned to the one or more attributes identifying the recommender service, and content being part of the context; the recommender agent being further configured to use the received input to identify the information in the knowledge source and to provide the identified information to a user of the portal.

* * * * *